US012092988B2

(12) United States Patent
Niwa et al.

(10) Patent No.: US 12,092,988 B2
(45) Date of Patent: Sep. 17, 2024

(54) SHEET SUPPORTING APPARATUS AND IMAGE FORMING APPARATUS

(71) Applicant: CANON KABUSHIKI KAISHA, Tokyo (JP)

(72) Inventors: Kunihiro Niwa, Shizuoka (JP); Yasuhiko Fuse, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 897 days.

(21) Appl. No.: 17/168,249

(22) Filed: Feb. 5, 2021

(65) Prior Publication Data

US 2021/0255579 A1 Aug. 19, 2021

(30) Foreign Application Priority Data

Feb. 18, 2020 (JP) ................................ 2020-025569

(51) Int. Cl.
*G03G 21/16* (2006.01)
*B65H 1/04* (2006.01)
(Continued)

(52) U.S. Cl.
CPC ........... *G03G 21/1647* (2013.01); *B65H 1/04* (2013.01); *B65H 1/266* (2013.01);
(Continued)

(58) Field of Classification Search
CPC ....... G03G 21/1647; G03G 2221/1654; G03G 21/1619; B65H 2402/10; B65H 2402/60; B65H 2405/332
See application file for complete search history.

(56) References Cited

U.S. PATENT DOCUMENTS 7,203,445 B2 4/2007 Uchida
8,857,811 B2 * 10/2014 Kakuta ................ B65H 3/0684
271/121

(Continued)

FOREIGN PATENT DOCUMENTS

JP 2000-330351 A 11/2000
JP 2002037470 A * 2/2002

(Continued)

OTHER PUBLICATIONS

Japanese Office Action dated Jan. 9, 2024, in related Japanese Patent Application No. 2020-025569.

*Primary Examiner* — Jeremy R Severson
(74) *Attorney, Agent, or Firm* — VENABLE LLP

(57) ABSTRACT

A sheet supporting apparatus includes a first casing, a sheet support to be drawn out in a first direction with respect to the first casing and to support a sheet, a first lock pivotably supported around a first pivot shaft by the first casing between a first lock position and a first non-lock position, and a second lock pivotably supported around a second pivot shaft by the first casing between a second lock position and a second non-lock position. A third lock is pivotably supported around a third pivot shaft by the first casing between a third lock position and a third non-lock position. The first casing includes a first support, a second support, a third support, and a fourth support each disposed on a top face of the first casing and configured to each support the second casing.

12 Claims, 6 Drawing Sheets

(51) Int. Cl.
*B65H 1/26* (2006.01)
*G03G 15/00* (2006.01)

(52) U.S. Cl.
CPC ..... *G03G 15/6502* (2013.01); *G03G 21/1619* (2013.01); *G03G 21/1623* (2013.01); *B65H 2402/10* (2013.01); *B65H 2402/60* (2013.01); *B65H 2405/332* (2013.01); *B65H 2801/06* (2013.01); *G03G 2221/1654* (2013.01)

(56) References Cited

U.S. PATENT DOCUMENTS

| | | | |
|---|---|---|---|
| 10,173,856 | B2 | 1/2019 | Matsumoto |
| 2018/0111784 | A1 | 4/2018 | Matsumoto |
| 2019/0106286 | A1 | 4/2019 | Matsumoto |

FOREIGN PATENT DOCUMENTS

| | | | |
|---|---|---|---|
| JP | 2004-048232 | A | 2/2004 |
| JP | 2005-026795 | A | 1/2005 |
| JP | 2018-070279 | A | 5/2018 |

* cited by examiner

SHEET SUPPORTING APPARATUS AND IMAGE FORMING APPARATUS

BACKGROUND OF THE INVENTION

Field of the Invention

The present invention relates to a sheet supporting apparatus supporting a sheet and an image forming apparatus including this sheet supporting apparatus.

Description of the Related Art

In general, in an image forming apparatus such as a printer, there is an apparatus used in a state of mounting a plurality of feed units capable of connecting to and disconnecting from the apparatus. For example, in some cases, an optional second feed unit provided separately from an apparatus body is mounted on the apparatus body of the image forming apparatus including a first feed unit. Further, in some cases, the plurality of feed units is mounted on the apparatus body in a state of being interconnected to each other. Herewith, a sheet loading capacity is increased, and it is possible to accommodate a large quantity of a print job.

Hitherto, the feed unit including a lock mechanism to lock adjacent feed units by first and second lock members has been suggested (Japanese Patent Laid-Open No. 2018-070279). These first and second lock member are each disposed at one of two positions on a diagonal line of a box shape feed unit.

Recently, a demand for solidity of an entire apparatus, for example, in a case where the feed unit is mounted on the image forming apparatus is increased, and an improvement in a lock performance of the lock mechanism is desired. However, in a case of the first and second lock members described in Japanese Patent Laid-Open No. 2018-070279, when an external force is applied in a direction orthogonally intersecting with the diagonal line described above, a rattling between the image forming apparatus and the feed unit is increased, and there is room to improve the lock performance.

SUMMARY OF THE INVENTION

According to one aspect of the present invention, a sheet supporting apparatus includes a first casing, a sheet supporting portion configured to be drawn out in a first direction with respect to the first casing and to support a sheet, a first lock member pivotably supported around a first pivot shaft by the first casing between a first lock position and a first non-lock position, the first lock position being a position where the first lock member engages with a second casing disposed above the first casing, the first non-lock position being a position where the first lock member does not engage with the second casing, a second lock member pivotably supported around a second pivot shaft by the first casing between a second lock position and a second non-lock position, the second lock position being a position where the second lock member engages with the second casing, the second non-lock position being a position where the second lock member does not engage with the second casing, and a third lock member pivotably supported around a third pivot shaft by the first casing between a third lock position and a third non-lock position, the third lock position being a position where the third lock member engages with the second casing, the third non-lock position being a position where the third lock member does not engage with the second casing. The third lock member is disposed at a position different from the first lock member and the second lock member in the first direction and a second direction, the second direction being orthogonal to the first direction and a gravity direction.

Further features of the present invention will become apparent from the following description of exemplary embodiments with reference to the attached drawings.

DESCRIPTION OF THE EMBODIMENTS

General Configuration

Hereinafter, an image forming apparatus according to this embodiment will be described with reference to the attached drawings. The image forming apparatus according to this embodiment is a laser beam printer including an image forming unit of an electrophotographic system. This printer forms an image on a sheet based on image information input from an external personal computer (PC) or read from a manuscript. To be noted, the sheet means a recording medium including a paper such as a standard paper and an envelope, a plastic film for such as an overhead transparency (OHT) sheet, and a cloth.

Figure 1:
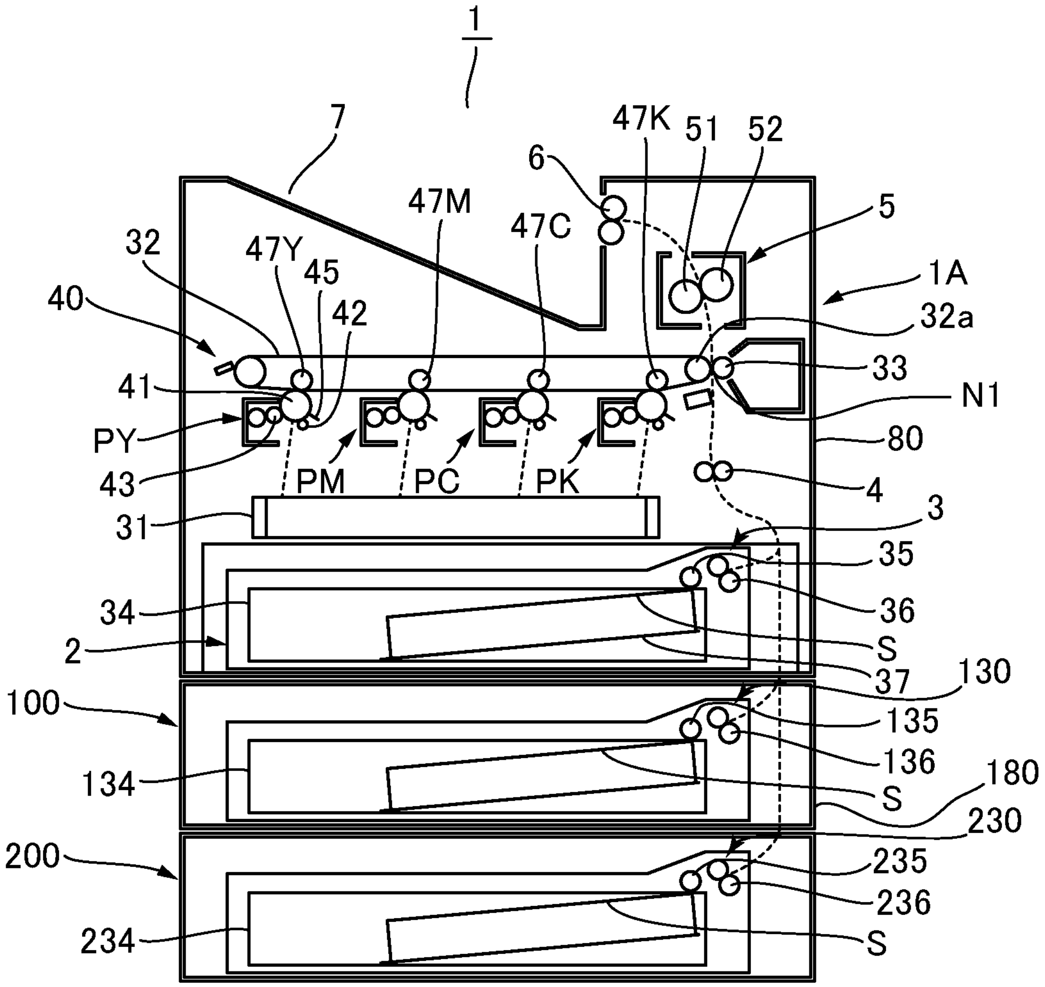
FIG. 1 is a schematic general view showing a printer according to this embodiment.

A printer body 1A, which is an apparatus body of printer 1, includes, as shown in FIG. 1, an image forming unit 40 and a sheet supporting unit 2 assembled to the printer body 1A. A feed portion 3 is provided to the sheet supporting unit 2 to feed a sheet S stored in a main body cassette 34 toward the image forming unit 40. The image forming unit 40 forms the image on the sheet S fed from the sheet supporting unit 2 or feed units 100 and 200, described later.

The image forming unit 40 includes four process cartridges PY, PM, PC, and PK, for respectively forming toner images of four colors yellow (Y), magenta (M), cyan (C), and black (K) and a scanner unit 31. The process cartridges PY, PM, PC, and PK are capable of connecting to and disconnecting from the printer body 1A, and, for example, when a toner runs out, the cartridge is replaced with the new cartridge.

To be noted, four process cartridges PY, PM, PC, and PK have the same configuration except for a difference in the color to form the image. Therefore, only the configuration and image forming process of the process cartridge PY will be described, and descriptions of the other process cartridges PM, PC, and PK will be omitted herein.

The process cartridge PY includes a photosensitive drum 41, a charge roller 42, a development roller 43, and a cleaning blade 45. The photosensitive drum 41 is constituted by coating an outer periphery of an aluminum cylinder with an organic photoconductive layer, and rotated by a drive motor, not shown. Further, the image forming unit 40 is provided with an intermediate transfer belt 32 which is wound around a drive roller 32*a*, and primary transfer rollers 47Y, 47M, 47C, and 47K are provided inside the intermediate transfer belt 32. Further, a secondary transfer roller 33 is provided facing the drive roller 32*a* across the intermediate transfer belt 32, and the intermediate transfer belt 32 and the secondary transfer roller 33 form a transfer nip N1 which transfers the image onto the conveyed sheet S.

When an image signal is input to the scanner unit 31 from the PC, not shown, and the like, the scanner unit 31 irradiates the photosensitive drum 41 of the process cartridge PY with a laser beam corresponding to the image signal.

At this time, a surface of the photosensitive drum 41 has been uniformly charged at a predetermined polarity and electric potential by the charge roller 42 in advance, and an electrostatic latent image is formed on the surface by being irradiated with the laser beam from the scanner unit 31. The electrostatic latent image formed on the photosensitive drum 41 is developed by the development roller 43, and the toner image of yellow (Y) is formed on the photosensitive drum 41.

Similarly, the scanner unit 31 irradiates each of the process cartridges PM, PC, and PK with the laser beam, and the toner images of magenta (M), cyan (C), and black (K) are formed on each of the photosensitive drums. The toner image of each color formed on each of the photosensitive drums is transferred onto the intermediate transfer belt 32 by the primary transfer rollers 47Y, 47M, 47C, and 47K, and conveyed to the transfer nip N1 by the intermediate transfer belt 32 rotated by the drive roller 32*a*. To be noted, the image forming process of each color is carried out in a timing to superimpose the toner image on an upstream toner image primarily transferred onto the intermediate transfer belt 32. To be noted, the toner remained remaining on the photosensitive drum 41 after the toner image has been transferred by the primary transfer roller 47Y is recovered by the cleaning blade 45.

In parallel with the image forming process as described above, the sheet supporting unit 2 starts operation to feed the sheet S. The feed portion 3 of the sheet supporting unit 2 includes the main body cassette 34 disposed in the printer body 1A, a pickup roller 35 to feed the sheet S, and a separation roller pair 36. The main body cassette 34 is inserted in a manner of capable of drawing out into a main body frame 80 of the printer body 1A by a user. Further, the main body cassette 34 includes an intermediate plate 37 supporting the sheet S and a spring urging the intermediate plate 37 upwards, not shown, and holds an uppermost sheet S of a sheet bundle stacked on the intermediate plate 37 at a predetermined feed position.

The uppermost sheet S supported by the intermediate plate 37 is conveyed by being fed by the pickup roller 35 while being separated into one sheet at a time by the separation roller pair 36. Skew of the sheet S conveyed by the separation roller pair 36 is corrected by a registration roller pair 4, and the sheet S is conveyed to the transfer nip N1 synchronizing with progress of image forming operations at the process cartridges PY, PM, PC, and PK.

The sheet S with the toner image transferred at the transfer nip N1 is conveyed to a fixing unit 5. The fixing unit 5 includes a heating roller 51 which is heated by a ceramic heater and the like, and a press roller 52 which abuts on the heating roller 51 at predetermined nip pressure. The toner image on the sheet S conveyed to the fixing unit 5 is fixed onto the sheet S by these heating roller 51 and press roller 52. The sheet S discharged from the fixing unit 5 is conveyed to a discharge roller pair 6, and stacked on a discharge tray 7 provided at an upper part of the printer body 1A by the discharge roller pair 6.

The printer 1 includes the main body frame 80 to support such as the process cartridges PY, PM, PC, and PK, the scanner unit 31, and the intermediate transfer belt 32, described above, and the main body frame 80 is constituted by a metal plate in this embodiment.

Since the image forming unit 40 and each conveyance portion are supported by the main body frame 80, it occurs that positional displacement of the toner of each color superimposed on the sheet S is generated by a distortion of the main body frame 80, and that a defect of the image is generated by a skewed conveyance of the sheet S. Therefore, rigidity of the main body frame 80 becomes important to maintain a high image quality.

Feed Unit

Next, the feed units 100 and 200 which are connected to the printer body 1A as an option will be described. The feed unit 100, serving as a sheet supporting apparatus, is capable of connecting to the main body frame 80 of the printer body 1A from below, and includes a cassette 134 in which the sheet S is stored, and a feed portion 130 which feeds the sheet S stored in the cassette 134. The feed portion 130 includes a pickup roller 135 which feeds the sheet S, and a separation roller pair 136 which separates the sheet S fed by the pickup roller 135 into one sheet at a time. The sheet S fed by the feed portion 130 is sent to an inside of the printer body 1A, and the image is formed as described above.

The cassette 134, serving as a sheet supporting portion, is supported by a casing 180 in a manner of capable of drawing out in a drawing out direction D1 (refer to FIG. 4), serving as a first casing of the feed unit 100. To be noted, in the following, a downstream side of the drawing out direction D1, which is a first direction, is stipulated as a front side of the apparatus, and an upstream side is stipulated as a back side of the apparatus. Further, a direction orthogonal to the drawing out direction D1 and a gravity direction D3 (refer to FIG. 4) is referred to as a width direction D2 (refer to FIG. 4), and the width direction D2, serving as a second direction, is a direction parallel to a lateral direction of the printer 1.

Further, the feed unit 200 is capable of connecting to the casing 180 of the feed unit 100 from below, and includes a cassette 234 in which the sheet S is stored, and a feed portion 230 which feeds the sheet S stored in the cassette 234. The feed portion 230 includes a pickup roller 235 which feeds the sheet S, and a separation roller pair 236 which separates the sheet S fed by the pickup roller 235 into one sheet at a time. The sheet S fed by the feed portion 230 is sent to the printer body 1A after having been sent to an inside of the feed unit 100, and the image is formed as described above.

As described above, the feed units 100 and 200 are connected to the printer body 1A in a form of being stacked, and capable of increasing a quantity of sheets storable inside the printer. To be noted, a number of the optional feed units are not limited to two tiers, and it is acceptable to stack equal to or more than three tiers of the feed units and further mount the printer body 1A on an upper surface of the feed units. Further, since the feed units 100 and 200 have the same configuration and the feed portions 130 and 230 respectively included in these feed units 100 and 200 have a similar configuration to the feed portion 3 of the printer body 1A, descriptions will be omitted herein.

Bottom Portion of Printer Body

Figure 2A:
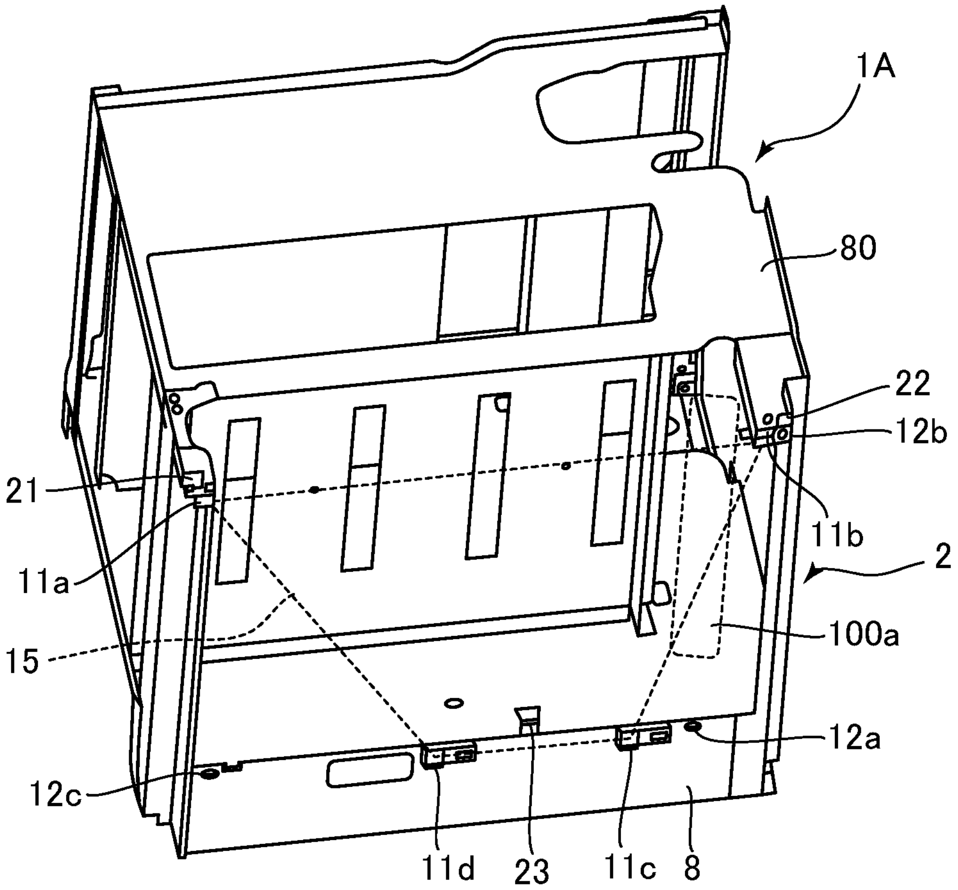
FIG. 2A is a perspective view showing a main body frame of a printer body.
Figure 2B:
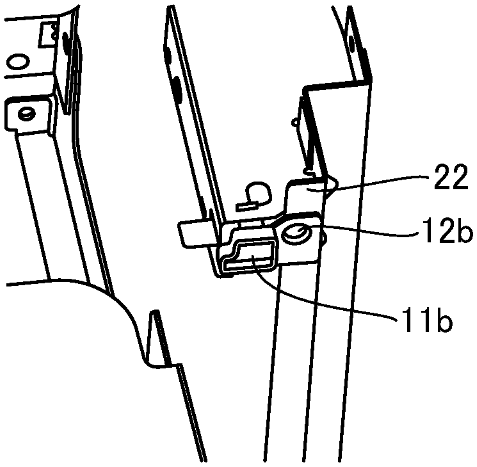
FIG. 2B is an enlarged perspective view showing an engaged portion and positioning hole.

Next, with reference to FIGS. 2A and 2B, a bottom portion of the printer body 1A, serving as a second casing, will be described. A sheet conveyance area 100*a* is provided to the sheet supporting unit 2 of the printer body 1A as shown in FIG. 2A. The sheet conveyance area 100*a* is provided so as to deliver the sheet to the printer body 1A from the feed unit 100 when the feed unit 100 is connected to the printer body 1A.

Grounding portions 11*a*, 11*b*, 11*c*, and 11*d* are provided at four positions on a bottom plate 8 of the main body frame 80. The grounding portion 11*a* is disposed in adjacent to a left-front side corner of the printer body, and the grounding portion 11*b* is disposed in adjacent to a right-front side corner of the printer body. The grounding portions 11*c* and 11*d* are disposed in adjacent to a back-center area of the printer body and in proximity to each other. Further, when each of the grounding portions 11*a*, 11*b*, 11*c*, and 11*d* is connected by a line segment, an imaginary trapezoid 15 is formed as shown by a broken line in FIG. 2A. That is, the grounding portions 11*a*, 11*b*, 11*c*, and 11*d* are disposed at vertices of the imaginary trapezoid 15 in a planar view.

To reduce an effect of unevenness and flatness of an installation surface on which the printer body 1A is installed, it is preferable that it is possible to ground the printer body 1A on the installation surface at three points. However, in a case where the external force is applied to the printer body 1A by operation of the user and the like, there is a possibility for the printer body 1A to rattle to the installation surface. Therefore, in this embodiment, by providing the grounding portions 11*a*, 11*b*, 11*c*, and 11*d* at the four positions to the printer body 1A, it is configured to reduce a rattling even in the case where the external force is applied to the printer body 1A. To be noted, if a number of grounding portions of the printer body 1A are too many, conversely the printer body 1A becomes easily affected by the unevenness and flatness of the installation surface, and rattles.

Further, three positioning holes 12*a*, 12*b*, and 12*c* are provided in the bottom plate 8 of the main body frame 80. The positioning hole 12*a* is a round hole provided at a right-back corner of the printer body. The positioning hole 12*b* is an elongated round hole provided at a left-back corner of the printer body as shown in FIG. 2B, and the positioning hole 12*c* is the elongated round hole provided at a right-front corner of the printer body as shown in FIG. 2A.

Bottom Portion of Feed Unit

Next, with reference to FIG. 3, a bottom portion of the feed unit 100 will be described. To be noted, since the feed unit 200 has the same configuration as the feed unit 100, hereinafter descriptions of the feed unit 200 will be omitted.

Figure 3:
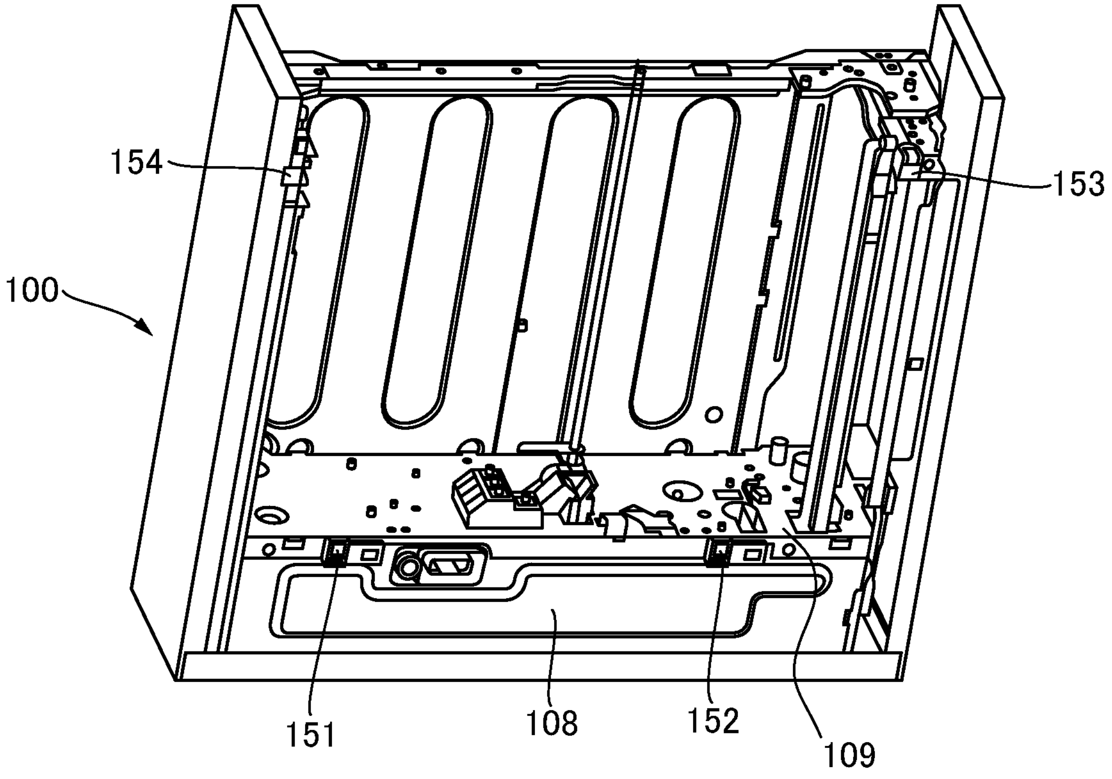
FIG. 3 is a perspective view showing a feed unit when viewed from a bottom side.

As shown in FIG. 3, a bottom plate 108 is provided at the bottom portion of the feed unit 100, the bottom plate 108 is coupled to a backside side plate 109 of the feed unit 100. Further, on the bottom portion of the feed unit 100, grounding portions 151, 152, 153, and 154 to ground at four positions on the feed unit 200 are provided. The grounding portion 154 is disposed in adjacent to a left-front side corner of the feed unit 100, and the grounding portion 153 is disposed in adjacent to a right-front side corner of the feed unit 100. The grounding portions 151 and 152 are provided on the bottom plate 108, and disposed in adjacent to a coupling portion of the bottom plate 108 and the backside side plate 109. Herewith, it is possible to ground the feed unit 100 on the installation surface at positions to strongly bear compression in a vertical direction, and possible to reduce a distortion of a frame of the feed unit 100.

Figure 4:
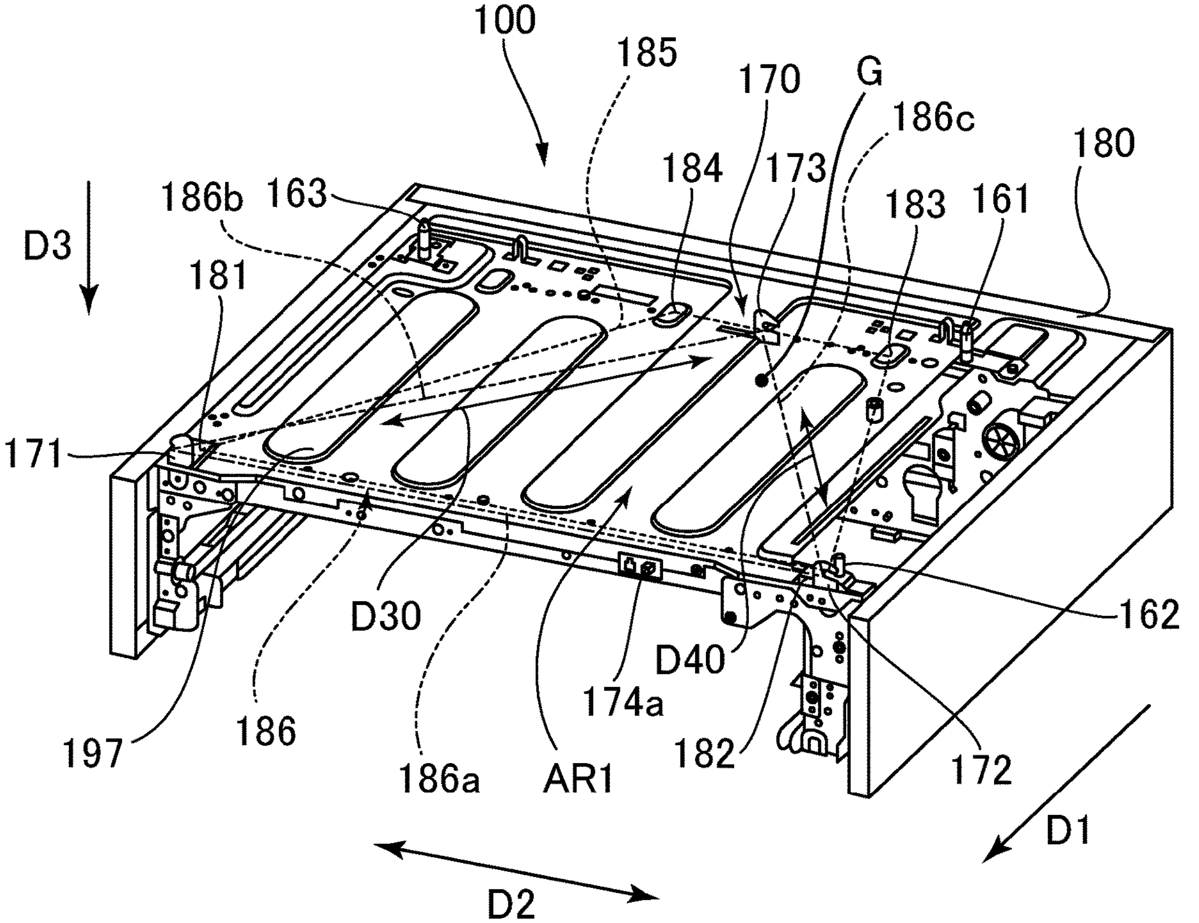
FIG. 4 is a perspective view showing the feed unit when viewed from a top face side.

Next, with reference to FIG. 4, a top face portion of the feed unit 100 will be described. As shown in FIG. 4, in the top face portion of the feed unit 100, positioning pins 161, 162, and 163 are respectively provided at right-back, left-back, and right-front positions. Further, on the top face portion, supporting portions 181 and 182 are respectively provided at left-front and right-front corners, and supporting portions 183 and 184 are provided in adjacent to a center area on a back side. The supporting portions 181, 182, 183, and 184, respectively serving as first, second, third, and fourth supporting portions, protrude slightly upwards from a top panel 197.

Lock Mechanism

Figure 5:
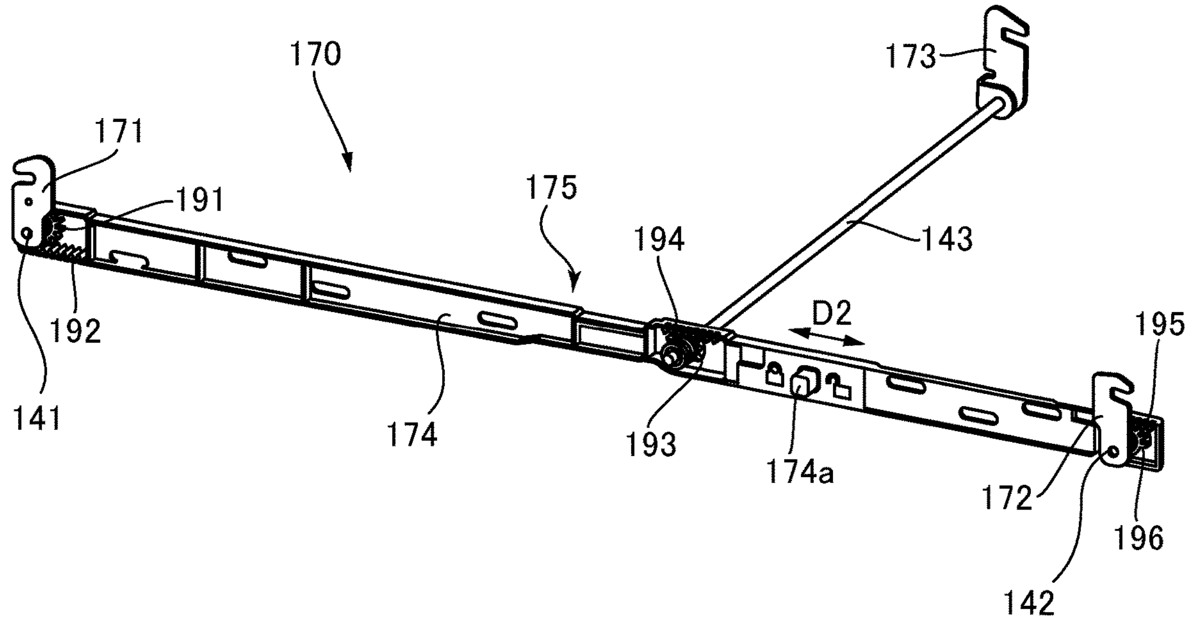
FIG. 5 is a perspective view showing a lock mechanism.

Next, with reference to FIGS. 5 and 6, a lock mechanism 170 provided to the feed unit 100 will be described. As shown in FIG. 5, the lock mechanism 170 includes lock members 171, 172, and 173 and an interlock unit 175. The interlock unit 175 includes a slide member 174, a third pivot shaft 143 whose one end is secured to the lock member 173, and pinion gears 191, 196, and 193 which are respectively secured to the lock members 171 and 172 and the other end of the third pivot shaft 143.

The slide member 174 is slidably supported by the casing 180 of the feed unit 100, and slidable in the width direction D2. Further, the slide member 174 includes rack portions 192, 195, and 194 which are capable of respectively engaging with the pinion gears 191, 196, and 193, and a holding portion 174*a*, and the rack portions 192, 195, and 194 extend in the width direction D2.

The lock member 171 and the pinion gear 191 are pivotable around a first pivot shaft 141, and the lock member 172 and the pinion gear 196 are pivotable around a second pivot shaft 142. The lock member 173 and the pinion gear 193 are pivotable around the third pivot shaft 143. By operating the holding portion 174*a* of the slide member 174, the user is able to operate the interlock unit 175 which moves the lock members 171, 172, and 173 in an interlocked manner.

Although the first pivot shaft 141, the second pivot shaft 142, and the third pivot shaft 143 are extending parallel to each other, it is not limited to this. For example, it is acceptable that any two or three of the first pivot shaft 141, the second pivot shaft 142, and the third pivot shaft 143 are not parallel to each other.

That is, when the user operates the holding portion 174*a*, serving as an operation portion, to one side in the width direction D2, the slide member 174 moves, and the lock members 171, 172, and 173 pivot by rotations of the pinion gears 191, 196, and 193.

As shown in FIG. 4, the lock members 171, 172, and 173 each protrude upwards from one of three holes provided in the top panel 197 of the feed unit 100. The lock member 173 is disposed at a position different from the lock members 171 and 172 in the drawing out direction D1 and the width direction D2. In a state where the feed unit 100 is connected to the printer body 1A, the lock members 171, 172, and 173 respectively engage with engaged portions 21, 22, and 23 provided on the main body frame 80 of the printer body 1A.

Figure 6A:
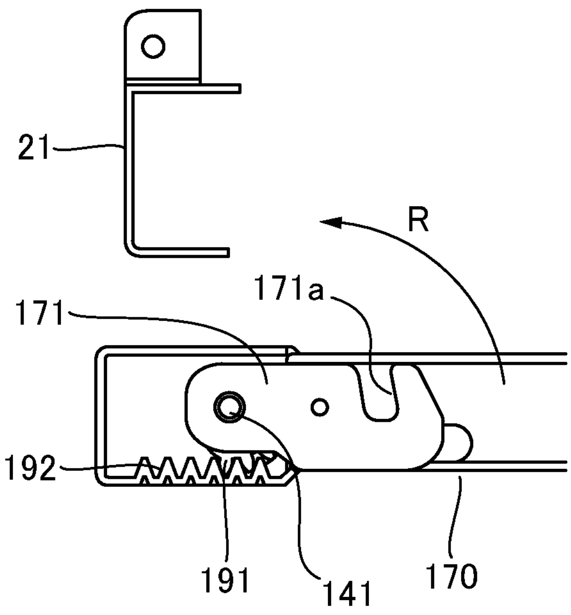
FIG. 6A is a side view showing a lock member positioned at a first non-lock position.
Figure 6B:
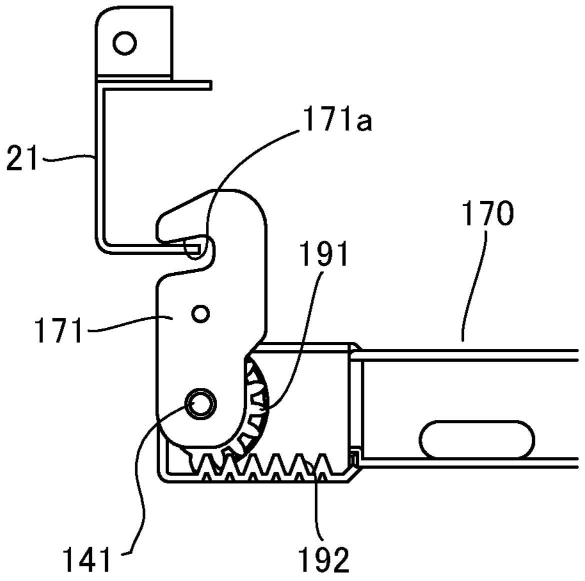
FIG. 6B is a side view showing the lock member positioned at a first lock position.

For example, as shown in FIGS. 6A and 6B, the lock member 171, serving as a first lock member, includes a hook portion 171*a* which has a groove shape capable of engaging with the engaged portion 21. The hook portion 171*a* engages with the engaged portion 21 by pivoting of the lock member 171 in an arrow R direction around the first pivot shaft 141. That is, the lock member 171 is pivotably supported around the first pivot shaft 141 by the casing 180 between a first lock position and a first non-lock position. The first lock position is a position where the lock member 171 engages with the engaged portion 21 of the main body frame 80. The first non-lock position is a position where the lock member 171 does not engage with the engaged portion 21 of the main body frame 80.

Also the lock members 172 and 173 have a similar shape to the lock member 171, and respectively engage with the engaged portions 22 and 23 by pivoting around the second and third pivot shafts 142 and 143. In other words, the lock member 172, serving as a second lock member, is pivotably supported around the second pivot shaft 142 by the casing 180 between a second lock position and a second non-lock position. The second lock position is a position where the lock member 172 engages with the engaged portion 22. The second non-lock position is a position where the lock member 172 does not engage with the engaged portion 22. The lock member 173, serving as a third lock member, is pivotably supported around the third pivot shaft 143 by the casing 180 between a third lock position and a third non-lock position. The third lock position is a position where the lock member 173 engages with the engaged portion 23. The third non-lock position is a position where the lock member 173 does not engage with the engaged portion 23.

Further, by operating the slide member 174 to one side in the width direction D2, all of these lock members 171, 172, and 173 pivot to either one of the lock and non-lock positions. Also, by operating the slide member 174 to the other side in the width direction D2, all of the lock members 171, 172, and 173 pivot to the other one of the lock and non-lock positions.

Since it is possible to pivot three lock members 171, 172, and 173 to the lock or non-lock positions at a time by operating the slide member 174 as described above, it is possible to improve an operability.

Connection of Feed Unit and Printer Body

Next, procedures to connect the feed unit 100 and the printer body 1A will be described. As shown in FIGS. 2A and 4, to mount and connect the printer body 1A onto the feed unit 100, the user aligns the positioning pins 161, 162, and 163 of the feed unit 100 with the positioning holes 12*a*, 12*b*, and 12*c* of the printer body 1A.

Then, the user mounts the printer body 1A on the feed unit 100 so as to engage the positioning pins 161, 162, and 163 with the positioning holes 12*a*, 12*b*, and 12*c*. In other words, the positioning pins 161, 162, and 163, each serving as a positioning portion, position the casing 180 of the feed unit 100 to the printer body 1A by engaging with the positioning holes 12*a*, 12*b*, and 12*c* of the printer body 1A. Since the positioning pins 161 and 162 and the positioning holes 12*a* and 12*b* are disposed in adjacent to both ends in a longitudinal direction of the sheet conveyance area 100*a*, it is possible to improve accuracy of positioning the sheet conveyance area 100*a*. Herewith, it is possible to reduce degradation of an image quality and the like resulting from the skew generated during a sheet conveyance, and possible to provide a high quality printed matter.

Further, since the positioning pins 161 and 163 and the positioning holes 12*a* and 12*c* are disposed in adjacent to both ends in the width direction D2 of the feed unit 100 and the printer body 1A, it is possible to effectively reduce positional displacement between the feed unit 100 and the printer body 1A. Herewith, it is possible to reduce differences in a gap and level of an exterior at a connection part of the feed unit 100 and the printer body 1A.

Further, the grounding portions 11*a*, 11*b*, 11*c*, and 11*d* at the four positions in the bottom portion of the printer body 1A are supported by the supporting portions 181, 182, 183, and 184 on the top face portion of the feed unit 100. At this point, when the supporting portions 181, 182, 183, and 184 are connected by line segments, an imaginary trapezoid 185 shown by a broken line in FIG. 4 is formed. That is, the supporting portions 181, 182, 183, and 184 are disposed at vertices of the imaginary trapezoid 185 in the planar view.

As described above, the feed unit 100 supports the printer body 1A by the supporting portions 181, 182, 183, and 184 at the four positions. Herewith, for example, even in a case where the casing 180 of the feed unit 100 is distorted by differences in heights of the supporting portions 181, 182, 183, and 184, distortion of the feed unit 100 hardly spreads to the printer body 1A, and defective image formation hardly occurs with this configuration.

Further, in a state where the printer body 1A is mounted on the feed unit 100, the user moves the lock members 171, 172, and 173 to each of the lock positions by operating the holding portion 174*a* of the slide member 174. Herewith, the feed unit 100 and the printer body 1A are locked together.

As shown in FIG. 4, when the lock members 171, 172, and 173 are connected to each other by line segments, an imaginary triangle 186 shown by a two-dot chain line in FIG. 4 is formed. The lock members 171, 172, and 173 are disposed such that a gravity center G of the printer body 1A is positioned in an area AR1 of this imaginary triangle 186 in the planar view. Herewith, even if the gravity center of the printer body 1A is elevated by stacking the multiple feed units 100 and height of the printer body 1A is increased, it is possible to reduce a rattling between the printer body 1A and the feed units 100. To be noted, the positioning pins 161, 162, and 163 are disposed outside the area AR1 in the planar view.

To be noted, a drive unit and a power unit provided in the printer body 1A are disposed on the back side of the apparatus, and units relating to a conveyance of the sheet are disposed on a right side of the apparatus. Therefore, the gravity center G of the printer body 1A is positioned on a back-right side than a center of the printer body 1A in the planar view. In view of the gravity center G of the printer body 1A as described above, the supporting portions 183 and 184 are disposed on the back-right side of the apparatus to some extent, and the positioning pin 161 and the positioning hole 12*a* are disposed at the back-right corner of the apparatus.

Further, a line segment 186*a* connecting the lock members 171 and 172 extends parallel to the width direction D2, and has approximately the same length as an overall width of the feed unit 100 in the width direction D2. Further, a line segment 186*b* connecting the lock members 171 and 173 extends in a third direction D30 intersecting with the drawing out direction D1 and the width direction D2. A line segment 186*c* connecting the lock members 172 and 173 extends in a fourth direction D40 intersecting with the drawing out direction D1 and the width direction D2, and different from the third direction D30.

Generally, the external force on the printer body 1A applied by the operation of the user and the like is applied in the front to back direction or a left to right direction, that is, in a direction parallel to the drawing out direction D1 or parallel to the width direction D2. In this embodiment, only the line segment 186*a*, which is one of the three line segments 186*a*, 186*b*, and 186*c* forming the imaginary triangle 186, extends parallel to the drawing out direction D1 or the width direction D2. By disposing the lock members 171, 172, and 173 as described above, lock performance of the feed unit 100 in the printer body 1A is improved, and it is possible to improve solidity of the printer 1.

For example, even if the external force is applied to the printer body 1A in a direction parallel to the drawing out direction D1 or the width direction D2, the rattling between the printer body 1A and the feed unit 100 is little. Therefore, a noise resulting from a vibration of the printer 1 is reduced, and it is possible to reduce the defective image formation. Further, it is possible to give an expensive image to the product and reliability in use.

Further, the lock members 171 and 172 are disposed at the positions different from each other in the width direction D2, are disposed in adjacent to the supporting portions 181 and 182, respectively, and are disposed at a downstream end portion of the casing 180 in the drawing out direction D1. The lock member 173 is disposed between the supporting portions 183 and 184 in the width direction D2.

For example, in a state of an ideal installation, there is not a distortion in the casing 180 of the feed unit 100, and the distortion is not generated in the main body frame of the printer body 1A mounted on the feed unit 100. When the lock members 171, 172, and 173 are positioned at the lock positions, in the state of this ideal installation, approximately 0.5 mm of gaps between the lock members 171, 172, and 173 and the engaged portions 21, 22, and 23 are provided. Therefore, securing the lock members 171, 172, and 173 does not apply the force from the lock members 171, 172, and 173 to the main body frame 80 of the printer body 1A via the engaged portions 21, 22, and 23.

Under an actual mounting environment of the printer body 1A and the feed unit 100, it is assumed that the flatness of a floor on which the feed unit 100 is mounted is low and the casing 180 of the feed unit 100 is distorted to some extent. Since the distortion of the casing 180 of the feed unit 100 eliminates clearances between the lock members 171, 172, and 173 and the engaged portions 21, 22, and 23, it occurs that the lock members 171, 172, and 173 apply the force to the casing 180. Herewith, the distortion of the casing 180 of the feed unit 100 is expected.

However, in this embodiment, since the lock members 171, 172, and 173 are provided in adjacent to the supporting portions 181, 182, 183, and 184, it is possible to reduce the distortion of the casing 180 resulting from the force applied from the lock members 171, 172, and 173. Therefore, it is possible to reduce the degradation of the image quality.

Further, since the lock members 171, 172, and 173 are components in a shape of a hook which pivots around each of the pivot shafts, it is possible to prevent a loss of the component as compared to fastening with a screw and the like, and possible to easily connect and disconnect the feed unit 100.

OTHER EMBODIMENTS

To be noted, although, in this embodiment, the lock member 173 is disposed at the position different from the lock members 171 and 172 in the drawing out direction D1 and the width direction D2, it is not limited to this. That is, it is acceptable that either one of the lock members 171, 172 and 173 is disposed at the position different from the other two of the lock members 171, 172 and 173. To be noted, it is acceptable to provide not three but equal to or more than four lock members.

Further, although, in any of the configurations described above, descriptions are provided using the printer 1 of the electrophotographic system, this disclosure is not limited to this. For example, it is possible to apply this disclosure to an image forming apparatus of an ink jet system which forms the image on the sheet by ejecting a liquid ink through a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-025569, filed Feb. 18, 2020, which is hereby incorporated by reference herein in its entirety.

What is claimed is:

1. A sheet supporting apparatus comprising:
- a first casing;
- a sheet support configured to be drawn out in a first direction with respect to the first casing and to support a sheet;
- a first lock pivotably supported around a first pivot shaft by the first casing between a first lock position and a first non-lock position, the first lock position being a position where the first lock engages with a second casing disposed above the first casing, the first non-lock position being a position where the first lock does not engage with the second casing;
- a second lock pivotably supported around a second pivot shaft by the first casing between a second lock position and a second non-lock position, the second lock position being a position where the second lock engages with the second casing, the second non-lock position being a position where the second lock does not engage with the second casing; and
- a third lock pivotably supported around a third pivot shaft by the first casing between a third lock position and a third non-lock position, the third lock position being a position where the third lock engages with the second casing, the third non-lock position being a position where the third lock does not engage with the second casing,
- wherein the third lock is disposed at a position different from the first lock and the second lock in the first direction and a second direction, the second direction being orthogonal to the first direction and a gravity direction, and
- wherein the first casing includes a first support, a second support, a third support, and a fourth support each disposed on a top face of the first casing and configured to each support the second casing.

2. The sheet supporting apparatus according to claim 1, wherein the first lock, the second lock, and the third lock are disposed such that a gravity center of the second casing is positioned in an area formed by connecting the first lock, the second lock, and the third lock to each other by line segments in a planar view.

3. The sheet supporting apparatus according to claim 2, further comprising a positioning mechanism disposed on the first casing and configured to position the first casing with respect to the second casing by engaging with the second casing.

4. The sheet supporting apparatus according to claim 3, wherein the positioning mechanism is disposed outside the area in the planar view.

5. The sheet supporting apparatus according to claim 1, wherein a line segment connecting the first lock and the second lock extends parallel to the second direction, wherein a line segment connecting the first lock and the third lock extends in a third direction intersecting with the first direction and the second direction, and wherein a line segment connecting the second lock and the third lock extends in a fourth direction which intersects with the first direction and the second direction, and is different from the third direction.

6. The sheet supporting apparatus according to claim 1, wherein the first lock and the second lock are disposed different from each other in the second direction, and are disposed at a downstream end portion of the first casing in the first direction.

7. The sheet supporting apparatus according to claim 1, wherein the first support, the second support, the third support, and the fourth support are disposed at vertices of an imaginary trapezoid in a planar view.

8. The sheet supporting apparatus according to claim 1, wherein the first support is disposed adjacent to the first lock, and wherein the second support is disposed adjacent to the second lock.

9. The sheet supporting apparatus according to claim 1, wherein the third lock is disposed between the third support and the fourth support in the second direction.

10. The sheet supporting apparatus according to claim 1, further comprising:

an interlocking lock configured to interlock the first lock, the second lock, and the third lock; and an interlocking lock operator configured to operate the interlocking lock.

11. The sheet supporting apparatus according to claim 1, wherein the first pivot shaft, the second pivot shaft, and the third pivot shaft extend parallel to each other.

12. An image forming apparatus, comprising:

the sheet supporting apparatus according to claim 1; and an image forming assembly provided in the second casing and configured to form an image on the sheet.

* * * * *